UNITED STATES PATENT OFFICE.

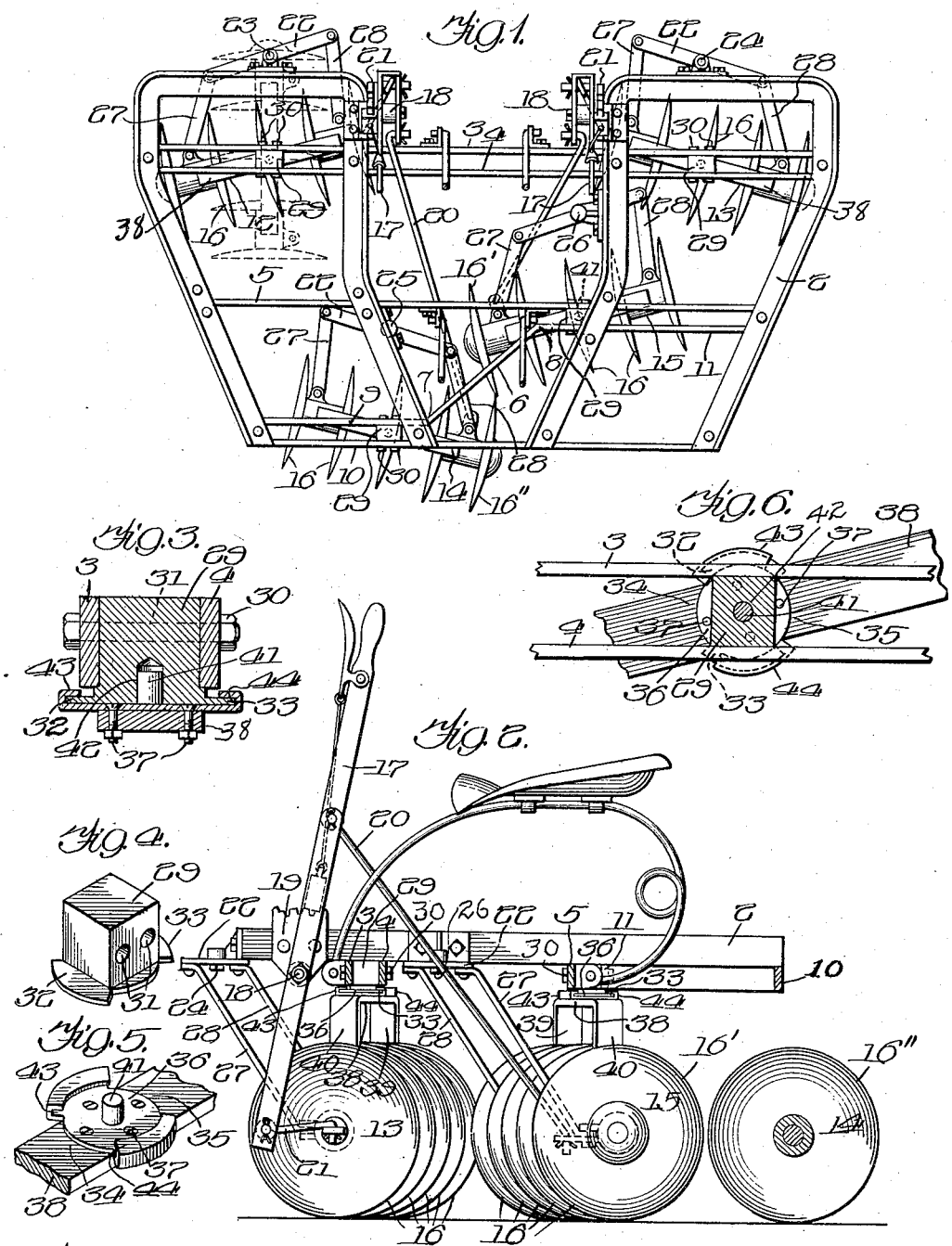

OSCAR CHRISTIANSON, OF CHICAGO, ILLINOIS.

DISK PULVERIZER.

1,079,746.  Specification of Letters Patent.  Patented Nov. 25, 1913.

Application filed February 12, 1912. Serial No. 677,122.

*To all whom it may concern:*

Be it known that I, OSCAR CHRISTIANSON, a citizen of the United States, residing at Chicago, in the county of Cook and State of Illinois, have invented certain new and useful Improvements in Disk Pulverizers, of which the following is a specification.

My invention relates to farming implements and has particular reference to pulverizers.

The objects of the invention are to provide a pulverizer of the disk-type, wherein the disks are mounted in a series of gangs pivotally movable relative to each other and arranged to obviate the formation of a "comb" or ridge between the ends of gangs, and to improve the mountings of the gangs to the end of securing greater pivotal stability and to make more convenient the insertions and removals of the gangs in the pulverizer frame.

With these objects in view my invention consists in the novel construction, combination and arrangement of parts hereinafter described in detail, illustrated in the accompanying drawing and incorporated in the appended claims.

In the drawing—Figure 1 is a plan view of my improved pulverizer. Fig. 2 is a vertical section. Fig. 3 is an enlarged vertical section of the parts which form the pivotal bearings for each gang. Figs. 4 and 5 are perspective views of the parts shown in Fig. 3 separated. Fig. 6 is a plan view, partly in section, of one of the bearings shown in Figs. 3, 4, and 5, together with a section of the frame to which one bearing-member is attached and a section of the gang to which the other bearing-member is attached.

In the several views 2 represents the frame of the machine, the rear portion of which is made narrower than the forward portion, the latter having the gangs therein spaced farther apart than the rear gangs. The body of the frame is preferably made of angle irons secured together by flat bars 3, 4, 5 and 6. The bars 3, 4 and 5 are straight, while the bar 6 is bent twice at 7 and 8 to form a part 9, which coöperates with a rear bar 10 of the frame, and a part 11 which coöperates with the bar 5 to provide parallel supports for the bearings of the rear gangs. The diagonal portion of the bar, labeled 6, serves as a transverse brace for the frame as a whole. There are four gangs 12, 13, 14 and 15 each carrying a series of five disks 16 and mounted in the frame on the bearings shown in Figs. 3 to 6 inclusive. The forward gang 12 and the rear gang 14 are simultaneously moved in opposite directions on their pivots by means of a lever 17 fulcrumed at 18 on the frame, or on a quadrant casting 19 bolted to said frame. Above the fulcrum 18 the lever is connected with the rear gang 14 by means of a connecting rod 20, and below the fulcrum the front gang 12 is connected with the lever through a connecting-rod 21. The same lever-control is provided for the gangs 13 and 15. In each instance the lever connecting rods are pivoted to the inner ends of the gangs, and the power thus applied to the inner ends is in each instance transmitted to the outer end of the gang in a direct pull or push force by means of an equalizer-bar pivoted forwardly of each gang on the frame, the respective pivots being indicated at 23, 24, 25, and 26. Each equalizer bar is connected with its gang through connecting bars or rods 27 and 28 pivoted at their ends to, respectively, the equalizer-bar and the ends of the gangs. The rods 27 and 28 thus assist the pivot on which the gang swings as a support for the gang and also serve as braces from the gang to the frame, or equalizer bar pivoted to the frame.

In leveling ground a "comb" or ridge has heretofore been left between the ends of the rear gangs, and various devices have been resorted to for leveling off this ridge, such as a rake following the rear gangs, and the like. I have obviated this difficulty by mounting the rear gangs so that the innermost disk of the one gang will be arranged tandem to the innermost disk of the other rear gang. These disks are separately indicated as 16' and 16'' in Figs. 1 and 2. These two disks are thus caused to travel where the usual ridge has been formed the forward disk throwing a part of the ridge to the right and the rear disk throwing the remainder of the ridge to the left, the disks on the rear gangs having their concave faces arranged as shown where the left hand gang disks face the left side of the machine and the disks on the right hand gang face the right side of the machine. The tandem arrangement of the innermost disks 16' and 16'' is effected by mounting the gang 15 forwardly of the gang 14.

The mountings of the gangs are designed to facilitate exchange of their positions to adapt the machine for the various kinds of work for which this class of machines are intended, or to reverse the facings of the disks without disturbing or removing the individual disks in each gang. In order to enable the operator to make such readjustment quickly and at the same time provide a stable pivot-support for each gang that will prevent its rocking, I have designed the bearing-members shown in Figs. 3 to 6. These bearing-members consist of a bearing block 29 for each gang, this block being, for the forward gangs, secured at any suitable point between and along the bars 3 and 4 by means of bolts 30 passing through holes 31 in the block and similar holes in the bars. For the rear gangs the bearing blocks are secured between the bar 9 and bar-portion 10 and between the bar 5 and the bar-portion 11, in like manner.

Extending laterally from the opposite sides of the lower end of the block 29 and flush with the face of said end, are a pair of segmental flanges 32 and 33 which fit into segmental cut-away portions 34 and 35 in a circular bearing-plate 36 secured by bolts or screws 37 to a horizontal portion 38 of a yoke having vertical legs 39 and 40 to the lower ends of which the shafts of the gangs are journaled in any suitable manner. The bearing-plate 36 carries a central pivot-stud 41 which engages a bore or socket 42 in the bearing-block 29. The flanges or ears 32 and 33 are interlocked with the bearing-plate 36 by means of segmental channels 43 and 44 formed by bending opposite portions of the bearing-plate 36 upon themselves as shown in Figs. 3 and 5. When the pivot 41 is engaged with the hole 42 and the flanges 32 and 33 are placed in the cut-away spaces 34 and 35 the bearing-plate and bearing-block are interlocked by turning the latter so that its ears engage the channels 43 and 44. This engagement is a sliding one and permits the gang to swing under operation of the lever 17 to the extent required for the angular adjustment of each gang without disengaging the block 29 from the plate 36, as the disengagement can only be effected by swinging the gang at right angles to the parallel bars which support the block, as indicated to the left in Fig. 1 by the dotted lines showing the position of the gang at the moment it is to be interlocked with the frame, or at the moment the bearing-plate 36 on the gang is to be interlocked with the bearing-block 29 on the frame. In addition to providing quick interlocking means, the ears 32 and 33 and the channels 43 and 44 support the gang against angular movement relative to its axis of rotation when the bar 38 of the yoke does not lie parallel with the bars between which the bearing blocks are supported.

Having thus described my invention, I claim as new and desire to secure by Letters Patent—

1. In a pulverizer, the combination with a frame having a wide forward portion and a narrow rear portion, of a pair of forward gangs of disks pivoted to said wide portion, a pair of rear gangs of disks pivotally attached to said narrow portion, said forward gangs being spaced apart by the construction of said frame to leave an uncultivated path therebetween, said rear gangs being arranged by the construction of said frame to cover or cultivate said uncultivated path, part of one of said rear gangs being also arranged to travel in part of the path of the other of said rear gangs.

2. In a pulverizer, the combination with a pair of forward and a pair of rear gangs of disks, of a frame having rearwardly narrowed portions and a space between said portions, said forward pair having its adjacent or innermost disks normally spaced apart substantially by said space to leave an uncultivated path therebetween, and said rear pair of gangs having their innermost disks arranged one in front of the other in said space.

3. In a pulverizer, the combination with a pair of pivoted forward gangs of disks arranged abreast, of pivoted rear gangs of disks having their pivots arranged diagonally relative to the path of movement of said forward gangs, a frame consisting of angle irons bent to form a contracted rear frame portion to which said gangs are pivoted, means for swinging a forward and a rear gang simultaneously, each of said rear gangs being arranged, at least partly, by the formation of said frame to traverse a part of the path of movement of one of the forward gangs as well as to overlap each other's paths of movement.

4. In a pulverizer, the combination of a rearwardly contracted frame having disk gang bearings thereon, with a pair of forward gangs of disks mounted abreast and a pair of rear gangs of disks having their pivots arranged diagonally relative to the forward gangs and on the contracted portion of the frame, said forward gangs being laterally spaced apart relative to the rear gangs by the formation of said frame so as to leave a strip of uncultivated ground between them, said rear gangs being brought together by the contraction of the rear portion of the frame to traverse said uncultivated ground, and the rearmost of said rear pair of gangs having a part thereof arranged to follow in the path traversed by the other of said rear gangs.

In testimony whereof I have hereunto set my hand in the presence of two subscribing witnesses.

OSCAR CHRISTIANSON.

Witnesses:
 JULIA M. BRISTOL,
 J. W. BECKSTROM.

Copies of this patent may be obtained for five cents each, by addressing the "Commissioner of Patents, Washington, D. C."